R. S. BRYANT
VEHICLE WHEEL.
APPLICATION FILED NOV. 24, 1914.

1,238,741.

Patented Sept. 4, 1917.
2 SHEETS—SHEET 1.

WITNESSES:
O. M. Kappler
Thos. H. Fay

INVENTOR
Richard S. Bryant
BY Fay and Oberlie
ATTORNEYS

R. S. BRYANT.
VEHICLE WHEEL.
APPLICATION FILED NOV. 24, 1914.
1,238,741.
Patented Sept. 4, 1917.
2 SHEETS—SHEET 2.
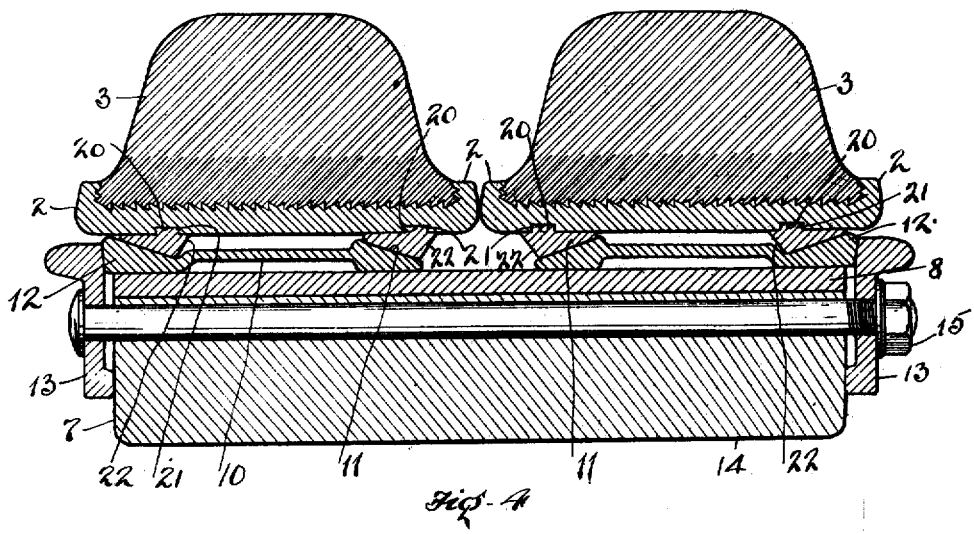
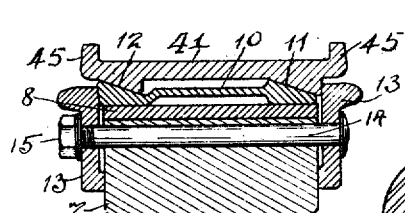
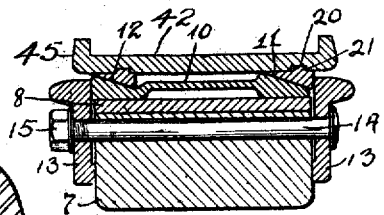
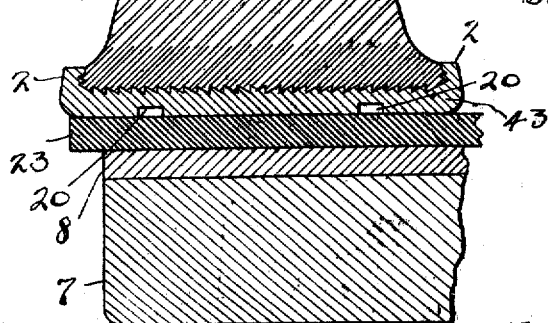
WITNESSES
O. W. Kappler
Thos. H. Fay
INVENTOR
Richard S. Bryant
BY Fay and Oberlin
ATTORNEYS

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

VEHICLE-WHEEL.

1,238,741.

Specification of Letters Patent.  Patented Sept. 4, 1917.

Application filed November 24, 1914. Serial No. 873,839.

*To all whom it may concern:*

Be it known that I, RICHARD S. BRYANT, a citizen of the United States, and a resident of Cleveland, county of Cuyahoga, and State of Ohio, have invented a new and useful Improvement in Vehicle-Wheels, of which the following is a specification, the principle of the invention being herein explained and the best mode in which I have contemplated applying that principle, so as to distinguish it from other inventions.

The present invention, relating as indicated to vehicle wheels, has more particular regard to the improvement of solid rubber tire wheels such as are largely used on automobile trucks and the like, in which the tire is directly vulcanized onto a metal band or rim that is, in turn, demountably secured onto the wheel felly in order to permit of the more convenient interchange and replacement of the tires. The object of the invention is to provide a simple and inexpensive form of locking device for demountably securing tire-supporting rims on the wheels, and particularly solid tire rims of the kind in question. Incidentally, provision is made, if desired, whereby such rims may be pressure-fitted to the wheel should this be desired. To the accomplishment of the foregoing and related ends, the invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
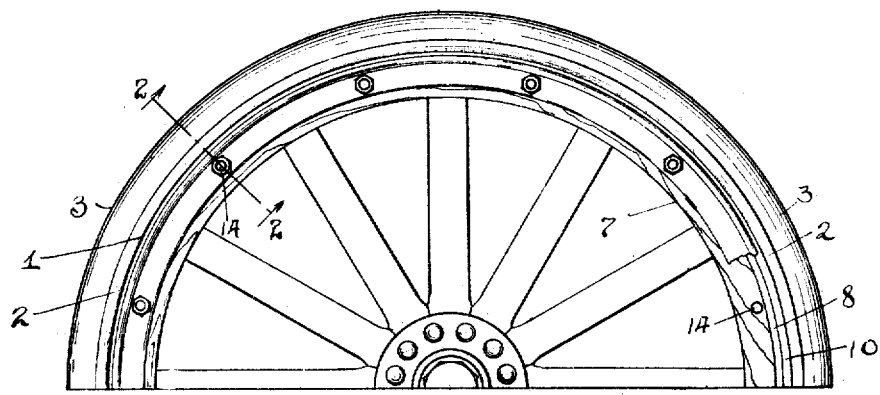
Figure 2:
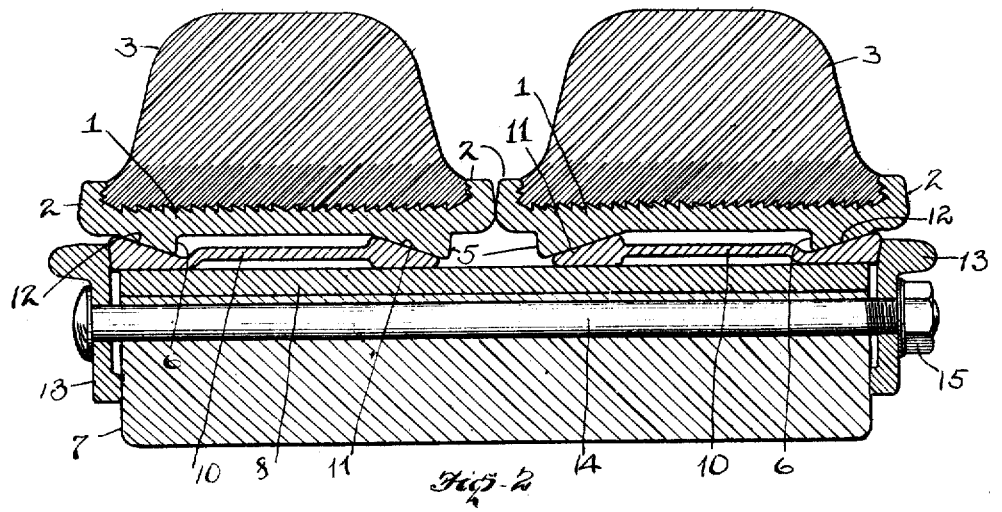
Figure 3:
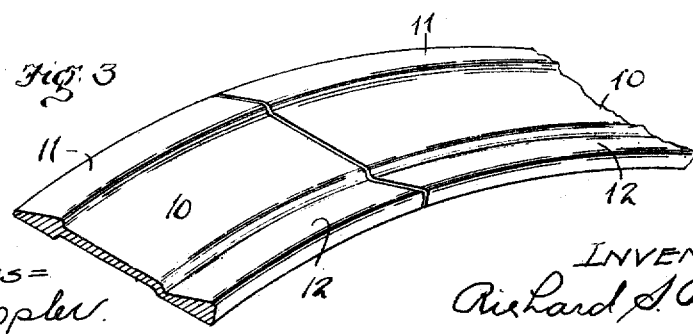

Figure 1 is a side elevational view of a portion of a vehicle wheel provided with my present improved demountable rim; Fig. 2 is a transverse sectional view of the same taken on the plane indicated by the line 2—2, Fig. 1; Fig. 3 is a broken perspective view of one of the elements of the locking device for thus demountably securing the rim on the felly; Fig. 4 is a transverse sectional view similar to Fig. 2 but showing a modification in construction; Fig. 5 illustrates in similar cross-section the arrangement where the rim is pressure-fitted onto the felly; and Figs. 6 and 7 respectively illustrate the application of the two foregoing constructions to a single tire wheel.

The tire-supporting rims 1, 40, 41, 42 and 43 (Figs. 1, 4, 6, 7 and 5 respectively) in the case of each of the several constructions illustrated in the aforesaid drawings, are provided with lateral upturned flanges 2 to incase the sides of the tire-base and it will be understood that the tread portion of the tire 3 will take on any desired form, both in transverse and longitudinal cross-section, the transverse section shown being merely typical; it will also be understood that the bases of such tires are vulcanized directly onto the supporting rims, the base portion of the tire being usually less resilient than the body and tread. In Fig. 6 I have shown the rim with smooth flanges 45. While my improved rim and means for securing the same on the wheel felly are thus shown in connection with solid tires, it will of course be obvious that the rims may be used equally well to support either single tube or double tube pneumatic tires if desired.

Projecting from the inner surface of the rim 1 are two spaced, parallel, inwardly projecting ribs 5 and 6, that, in the form of construction illustrated in Fig. 2, are integral with the rim, although they may be made detachable, if desired, as will be described later. The ribs 5 and 6 are disposed adjacent the respective edges of the rim, the height of the innermost rib 5 being preferably greater than that of the outermost, and both of said ribs having their inner faces beveled so as to incline toward the outer edge of the rim, that is toward the edge which lies nearest the respective lateral faces of the felly 7. The latter may take on any desired form, being shown as of wood, as usual in heavy wheel construction, and surrounded by a felly band 8, the two together representing what for convenience may be termed the wheel body. Between such felly band and the inner face of each rim is introduced a wedge-ring 10 having at its inner edge a wedge portion 11 adapted to fit between the felly band and the innermost rib on the rim's inner face, and having at its outer edge a second wedge portion 12 adapted similarly to fit between the felly band and the outermost rib on the rim. The distance between these wedge portions is such as to cause them to press uniformly upon both ribs 5 and 6, when the ring is forced inwardly transversely of the wheel felly, the portion of the ring between the wedge portions being formed as a web which is capable of flexing or yielding transversely, and thus of equalizing the thrust exerted by the two wedge portions on the corresponding ribs. Said ring is split at one point in its circumference as shown in Fig. 3. In the case of the dual construction illustrated in Fig. 2, the two wedge rings 10 that coöperate with the respective rims, are similar in all respects, being merely inserted from the opposite sides of the felly.

In order to force said rings 10 inwardly transversely of the wheel body or felly, and thus produce the desired wedging effect, I employ in the illustrated construction two side flanges 13 of more or less familiar form, which are directly applied to the respective lateral faces of said felly and are adapted to be drawn together by means of transverse bolts 14, the heads of which engage one such flange while the nuts 15 on their opposite ends may be drawn up more or less tightly, as occasion demands. These flanges extend radially beyond the felly and felly-band a sufficient distance to engage the outer edges of the respective wedge rings 10 without interfering with the projecting sides of the tire-supporting rims where the latter, as frequently is the case, somewhat overhang the felly.

The mode of operation of the foregoing improved construction should be fairly obvious from the description just given of its component parts. The tire-supporting rims 1 being first loosely fitted in laterally abutting relation around the wheel body with their shorter ribs 6 nearest the outside, the wedge rings 10 are introduced and forced in, as far as they will go, by tightening the nuts 15 on the bolts 14, whereby the flanges 13 are caused to press against the outer edges of said rings. The inner edges of the rims, if not previously brought into contact, will be forced into such contact by the action of the wedge rings, thus centering said rims at the same time that they are locked in a radial direction. The necessity for a "centering ring" such as has heretofore been required in dual rim mountings, is thus avoided, and the operation simplified at the same time that the number of parts is reduced. Furthermore, the rims are interchangeable by simply reversing them, and the same is true of the wedge rings.

In order to render the rims convertible to use in so-called "pressure-fitted" mountings, where a plain cylindrical band is forced between the rim and the felly-band under pressure, the fit being so tight as to firmly secure the former in place on the latter, it is of course desirable that the inner face of the rim be substantially smooth, that is cylindrical, and not ribbed as in the construction just described. Accordingly I may modify such described construction by rendering the ribs detachable instead of integral, as shown in Fig. 4. To this end the inner face of the rim 1 is thus provided with two circumferential grooves 20 adapted to receive corresponding tongues 21 on ribs 22 that are transversely split and possess sufficient resilience to normally be retained in such grooves. These ribs 23 have beveled faces similar to those of the permanent ribs 5 and 6 and in Figs. 1 and 2 are so proportioned and disposed as to be adapted to coöperate with the wedge portions 11 and 12 of the ring 10 as before. They are also preferably made interchangeable, although not necessarily so. The mode of operation in applying the rims and forcing the wedge rings into place is of course exactly the same in this construction as in the preceding one.

Should it be desired, however, to pressure-fit one of these rims onto a felly, it is merely necessary to detach the ribs 22 and insert the plain annular band 23 (see Fig. 5) between the rim and felly band as above described, such band being of sufficient thickness to require considerable force to be thus inserted, and thus correspondingly firmly secure the parts together.

It will be understood of course that either of the foregoing constructions may be utilized in mounting a single rim on a wheel just as well as a pair of rims. Thus Figs. 6 and 7 respectively illustrate the arrangement for mounting a single one of each of such two forms respectively on an appropriate wheel felly. It will be observed that the one flange 13, which will ordinarily be the one on the inner side of the wheel as in use, is adapted to serve as an abutment or shoulder to receive either the adjacent integral rib 5 or the adjacent detachable rib 20 as the case may be.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a vehicle wheel, the combination with the wheel body; of two tire-supporting rims adapted to be loosely fitted in laterally abutting relation on said body, each of said rims being provided on its inner face with a pair of spaced ribs having beveled faces inclining toward the adjacent side of said body; two transversely split wedge-rings adapted to be interposed between said body and said rims, respectively, each of said rings having a pair of spaced beveled faces complementary to those of the ribs on the corresponding rim; and means adapted to force said rings toward each other.

2. In a vehicle wheel, the combination with the wheel body; of two tire-supporting rims adapted to be loosely fitted in laterally abutting relation on said body, each of said rims being provided on its inner face with a pair of spaced ribs having beveled faces inclining toward the adjacent side of said body; two transversely split wedge-rings adapted to be interposed between said body and said rims, respectively, each of said rings having a pair of spaced beveled faces complementary to those of the ribs on the corresponding rim; flanges on the respective sides of said body adapted to press against the adjacent wedge-ring; and means adapted to draw said flanges toward said body.

3. In a vehicle wheel, the combination with the wheel body; of two tire-supporting rims adapted to be loosely fitted in laterally abutting relation on said body, each of said rims being provided on its inner face with a pair of spaced ribs having beveled faces inclining toward the adjacent side of said body; two transversely split wedge-rings adapted to be interposed between said body and said rims, respectively, each of said rings having a pair of spaced beveled faces complementary to those of the ribs on the corresponding rim; and means adapted to force said rings toward each other.

4. In a vehicle wheel, the combination with the wheel body: of two tire-supporting rims adapted to be loosely fitted in laterally abutting relation on said body; a pair of spaced ribs detachably engaging the inner face of each of said rims, said ribs having beveled faces inclining toward the adjacent side of said body: two transversely split wedge-rings adapted to be interposed between said body and said rims, respectively, each of said rings having a pair of spaced beveled faces complementary to those of the ribs on the corresponding rim; and means adapted to force said rings toward each other.

5. In a vehicle wheel, the combination with the wheel body: of two tire-supporting rims adapted to be loosely fitted in laterally abutting relation on said body, each of said rims being formed with transversely spaced, circumferentially extending grooves near its respective edges; ribs respectively detachably engaging such grooves in each rim and having beveled faces inclining toward the adjacent side of said body: two transversely split wedge-rings adapted to be interposed between said body and said rims, respectively, each of said rings having a pair of spaced beveled faces complementary to those of the ribs on the corresponding rim; and means adapted to force said rings toward each other.

6. In a vehicle wheel, the combination with the wheel body; of two tire-supporting rims adapted to be loosely fitted in laterally abutting relation on said body, each of said rims being formed with transversely spaced, circumferentially extending grooves near its respective edges; ribs respectively detachably engaging such grooves in each rim and having beveled faces inclining toward the adjacent side of said body; two transversely split wedge-rings adapted to be interposed between said body and said rims, respectively, each of said rings having a pair of spaced beveled faces complementary to those of the ribs on the corresponding rim; flanges on the respective sides of said body adapted to press against the adjacent wedge-ring; and means adapted to draw said flanges toward said body.

7. In a vehicle wheel, the combination with the wheel body; of a tire-supporting rim adapted to be loosely fitted on said body; a pair of spaced ribs detachably engaging the inner face of said rim, said ribs having beveled faces inclining toward the same side of said body: a transversely split wedge-ring having a pair of spaced beveled faces complementary to those on said ribs; and means adapted to force said wedge-ring transversely of said rim.

8. In a vehicle wheel, the combination with the wheel body: of a tire-supporting rim adapted to be loosely fitted on said body; said rim being formed with transversely spaced, circumferentially extending grooves near its respective edges; ribs respectively detachably engaging such grooves in said rim and having beveled faces inclining toward the same side of said body: a transversely-split wedge ring having a pair of spaced beveled faces complementary to those on said ribs; and means adapted to force said wedge-ring transversely of said rim.

Signed by me, this 16 day of November, 1914.

RICHARD S. BRYANT.

Attested by:
V. WILLIAMS,
R. C. COOLEY.